United States Patent
Naruse et al.

(10) Patent No.: US 12,043,260 B2
(45) Date of Patent: Jul. 23, 2024

(54) VEHICLE CONTROL SYSTEM AND VEHICLE CONTROL METHOD

(71) Applicant: HONDA MOTOR CO., LTD., Tokyo (JP)

(72) Inventors: Tadashi Naruse, Tokyo (JP); Naoya Murata, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 234 days.

(21) Appl. No.: 17/589,120

(22) Filed: Jan. 31, 2022

(65) Prior Publication Data

US 2022/0314991 A1  Oct. 6, 2022

(30) Foreign Application Priority Data

Mar. 31, 2021 (JP) ................................. 2021-060021

(51) Int. Cl.
*B60W 30/182* (2020.01)
*B60W 20/10* (2016.01)
*B60W 50/10* (2012.01)
*B60W 50/14* (2020.01)

(52) U.S. Cl.
CPC .......... *B60W 30/182* (2013.01); *B60W 20/10* (2013.01); *B60W 50/10* (2013.01); *B60W 50/14* (2013.01); *B60W 2050/146* (2013.01); *B60W 2540/10* (2013.01); *B60W 2540/12* (2013.01)

(58) Field of Classification Search
CPC .... B60W 30/182; B60W 20/10; B60W 50/10; B60W 50/14; B60W 2050/146; B60W 2540/10; B60W 2540/12; B60W 20/40; B60W 2540/215; B60W 50/082;
(Continued)

(56) References Cited

U.S. PATENT DOCUMENTS

| 2010/0063661 A1* | 3/2010 | Saito | B60W 30/10 903/903 |
| 2016/0200315 A1* | 7/2016 | Fracchia | B60W 10/06 180/65.265 |
| 2016/0243940 A1* | 8/2016 | Kawasaki | B60K 35/00 |

(Continued)

FOREIGN PATENT DOCUMENTS

| FR | 3062617 A1 * | 8/2018 | ............ B60K 6/543 |
| JP | 4306085 B2 * | 7/2009 | ............ B60K 15/04 |

(Continued)

OTHER PUBLICATIONS

English machine translation of JP2017222308A (Year: 2017).*

*Primary Examiner* — Navid Z. Mehdizadeh
*Assistant Examiner* — Caitlin R McCleary
(74) *Attorney, Agent, or Firm* — Rankin, Hill & Clark LLP (57) ABSTRACT

A vehicle control system includes a mode setting control unit that suspends cancellation of a motor drive priority mode when a drive mode is changed from a first drive mode to a second drive mode in response to acceptance of a change to the second drive mode when a driving status recognition unit recognizes that a vehicle is able to drive or is driving in a state in which the motor drive priority mode is set and the drive mode is set to the first drive mode, and cancels the suspension to cancel the motor drive priority mode when the drive mode change acceptance unit does not accept a change to the third drive mode during a first suspension period.

7 Claims, 9 Drawing Sheets

(58) Field of Classification Search
CPC ........ B60K 2370/152; B60K 2370/172; B60K 35/00; Y02T 10/62
See application file for complete search history.

(56) References Cited

U.S. PATENT DOCUMENTS

2019/0118830 A1* 4/2019 Kwon .................... B60K 35/10
2023/0064386 A1* 3/2023 Mizui .................... B60R 16/02

FOREIGN PATENT DOCUMENTS

| JP | 2012-224209 | | 11/2012 | |
|----|-------------|---|---------|---|
| JP | 2014-177255 | | 9/2014 | |
| JP | 2017222308 | A * | 12/2017 | |
| JP | 2018008544 | A * | 1/2018 | |
| WO | WO-2013088553 | A1 * | 6/2013 | ............. B60K 6/445 |

* cited by examiner

VEHICLE CONTROL SYSTEM AND VEHICLE CONTROL METHOD

INCORPORATION BY REFERENCE

The present application claims priority under 35 U.S.C. § 119 to Japanese Patent Application No. 2021-060021 filed on Mar. 31, 2021. The content of the application is incorporated herein by reference in its entirety.

BACKGROUND OF THE INVENTION

Field of the Invention

The present invention relates to a vehicle control system and a vehicle control method.

Description of the Related Art

There has been conventionally known a vehicle control device that changes vehicle driving characteristics according to a drive mode selected by a user (for example, see Japanese Patent Laid-Open No. 2012-224209). In a hybrid vehicle having an engine and a motor as driving force sources, control is performed to switch between an EV drive mode in which the vehicle is driven only by a motor as a driving force source and an HV drive mode in which the vehicle is driven by both of the engine and the motor as driving force sources (for example, see Japanese Patent Laid-Open No. 2014-177255). In the hybrid vehicle, it is assumed that, in addition to selection of a drive mode, setting and cancellation of a motor drive priority mode in which the vehicle is driven only by a motor as a driving force source can be performed in response to a user's operation. In this case, when the drive mode is changed in response to a user's operation to change the drive mode, the motor drive priority mode may need to be canceled depending on the specifications of the drive mode. When the motor drive priority mode is thus canceled in response to a change in the drive mode, a vehicle operation state change such as starting the engine in the stopped state may cause the user to feel strangeness.

The present invention is made in the light of the above-described background, and has an object to provide a vehicle control system that reduces user's feeling of strangeness by canceling or suspending a motor drive priority mode in response to a change in a drive mode, and a vehicle control method.

SUMMARY OF THE INVENTION

A first inventive aspect to achieve the object described above provides a control system of a vehicle capable of switching a plurality of drive modes using an engine and a motor as driving force sources, and setting and canceling a motor drive priority mode in which driving only by the motor is prioritized, the drive modes including a first drive mode, a second drive mode, and a third drive mode, the control system including a motor drive priority mode acceptance unit configured to accept setting and cancellation of the motor drive priority mode in response to an operation by a user of the vehicle, a drive mode change acceptance unit configured to accept a change in the drive mode in order of the first drive mode, the second drive mode, and the third drive mode every time a selection operation is performed by the user, a mode setting control unit configured to perform setting and cancellation of the motor drive priority mode and setting the drive mode according to an acceptance status by the motor drive priority mode acceptance unit and the drive mode change acceptance unit, and cancel the motor drive priority mode to set to the second drive mode, a display control unit configured to indicate, on a display unit provided in the vehicle, an energy management mode display indicating a setting status of the motor drive priority mode and a drive mode display indicating a setting status of the drive mode, and a driving status recognition unit configured to recognize a driving status of the vehicle, wherein the mode setting control unit suspends cancellation of the motor drive priority mode when the drive mode is changed from the first drive mode to the second drive mode in response to acceptance of a change to the second drive mode by the drive mode change acceptance unit when the driving status recognition unit recognizes that the vehicle is drivable or is driving in a state in which the motor drive priority mode is set and the drive mode is set to the first drive mode, and cancels the suspension to cancel the motor drive priority mode when the drive mode change acceptance unit does not accept a change to the third drive mode during a first suspension period of time from a time point at which the drive mode is changed from the first drive mode to the second drive mode until a first predetermined period of time elapses, and the display control unit sets the energy management mode display to a second display aspect different from a first display aspect when the suspension is not made, while the cancellation of the motor drive priority mode is suspended by the mode setting control unit.

The above-described vehicle control system may have a configuration in which the mode setting control unit cancels the suspension when the drive mode change acceptance unit accepts a change from the second drive mode to the third drive mode before the first suspension period of time elapses, and sets or cancels the motor drive priority mode according to a specification of the third drive mode.

The above-described vehicle control system may have a configuration in which the drive mode includes a fourth drive mode, and the drive mode change acceptance unit accepts a change in the drive mode in order of the first drive mode, the second drive mode, the third drive mode and the fourth drive mode every time a selection operation is performed by the user, and the mode setting control unit changes the drive mode to the third drive mode when the drive mode change acceptance unit accepts a change to the third drive mode before the first suspension period of time elapses, cancels the suspension when the drive mode change acceptance unit does not accept a change to the fourth drive mode during a second suspension period of time from a time point at which a change to the third drive mode is accepted until a second predetermined period of time elapses, and sets or cancels the motor drive priority mode according to a specification of the third drive mode.

The above-described vehicle control system may have a configuration in which the mode setting control unit cancels the suspension when an operation of an acceleration operation unit provided in the vehicle is performed during the first suspension period of time, to cancel the motor drive priority mode.

The above-described vehicle control system may have a configuration in which the display control unit indicates, on the display unit, a reason why the motor drive priority mode is canceled when the motor drive priority mode is canceled in response to the cancellation of the suspension by the mode setting control unit.

The above-described vehicle control system may have a configuration in which the display control unit indicates the energy management mode display on a first display region in the display unit and indicates the drive mode display on a second display region in the display unit, and when the suspension is canceled to cancel the motor drive priority mode by the mode setting control unit, the drive mode display indicated on the second display region is moved to the first display region to hide the energy management mode display, and then the drive mode display is moved to the second display region and the energy management mode display indicating that the motor drive priority mode is canceled is indicated in the first display region.

The above-described vehicle control system may have a configuration in which the second display aspect is a display aspect in which an indication according to the first display aspect blinks or fades out.

A second inventive aspect to achieve the object described above provides a vehicle control method to be executed by a computer to control a vehicle capable of switching a plurality of drive modes using an engine and a motor as driving force sources, and setting and canceling a motor drive priority mode in which driving only by the motor is prioritized, the drive modes including a first drive mode, a second drive mode, and a third drive mode, the method including a motor drive priority mode acceptance step of accepting setting and cancellation of the motor drive priority mode in response to an operation by a user of the vehicle, a drive mode change acceptance step of accepting a change in the drive mode in order of the first drive mode, the second drive mode, and the third drive mode every time a selection operation is performed by the user, a mode setting control step of performing setting and cancellation of the motor drive priority mode and setting the drive mode according to an acceptance status by the motor drive priority mode acceptance step and the drive mode change acceptance step, and canceling the motor drive priority mode to set to the second drive mode, a display control step of indicating, on a display unit provided in the vehicle, an energy management mode display indicating a setting status of the motor drive priority mode and a drive mode display indicating a setting status of the drive mode, and a driving status recognition step of recognizing a driving status of the vehicle, wherein the mode setting control step suspends cancellation of the motor drive priority mode when the drive mode is changed from the first drive mode to the second drive mode in response to acceptance of a change to the second drive mode by the drive mode change acceptance step when the driving status recognition step recognizes that the vehicle is drivable or is driving in a state in which the motor drive priority mode is set and the drive mode is set to the first drive mode, and cancels the suspension to cancel the motor drive priority mode when the drive mode change acceptance step does not accept a change to the third drive mode during a first suspension period of time from a time point at which the drive mode is changed from the first drive mode to the second drive mode until a first predetermined period of time elapses, and the display control step sets the energy management mode display to a second display aspect different from a first display aspect when the suspension is not made, while the cancellation of the motor drive priority mode is suspended by the mode setting control step.

The above-described vehicle control system can reduce user's feeling of strangeness by invalidating cancellation of the energy management function for a predetermined period of time in response to a change in a drive mode.

DETAILED DESCRIPTION OF THE PREFERRED EMBODIMENTS

1. Configurations of Vehicle Control System and Vehicle

Configurations of a vehicle control system 10 of the present embodiment and a vehicle 1 mounted with the vehicle control system 10 will be described with reference to FIG. 1. The vehicle 1 includes a speed sensor 40, a yaw rate sensor 41, a brake pedal sensor 42, an accelerator pedal sensor 43, a switch unit 50, a METER 55, a drive unit 80, a transmission unit 90, a brake unit 91, and a suspension unit 92.

The speed sensor 40 detects a driving speed of an own vehicle 1 and outputs a speed detection signal to the vehicle control system 10. The yaw rate sensor 41 detects a yaw rate (rotational angular speed about a vertical axis) and outputs a yaw rate detection signal to the vehicle control system 10.

The brake pedal sensor 42 detects an operation amount of a brake pedal (not illustrated) and outputs an operation amount detection signal to the vehicle control system 10. The accelerator pedal sensor 43 detects an operation amount of an accelerator pedal (not illustrated) and outputs an operation amount detection signal to the vehicle control system 10.

The switch unit 50 includes a drive mode switch 51 and an energy management mode switch 52. The drive mode switch 51 is a toggle switch that allows an Up or a Down operation. A user of the vehicle 1 can switch the drive mode of the vehicle 1 by the Up or Down operation to the drive mode switch 51. A switching aspect of the drive mode will be described later. The energy management mode switch 52 is a press button switch, and a user operates the energy management mode switch 52 to switch an energy management mode of the vehicle 1. A switching aspect of the energy management mode will be described later.

Figure 2:
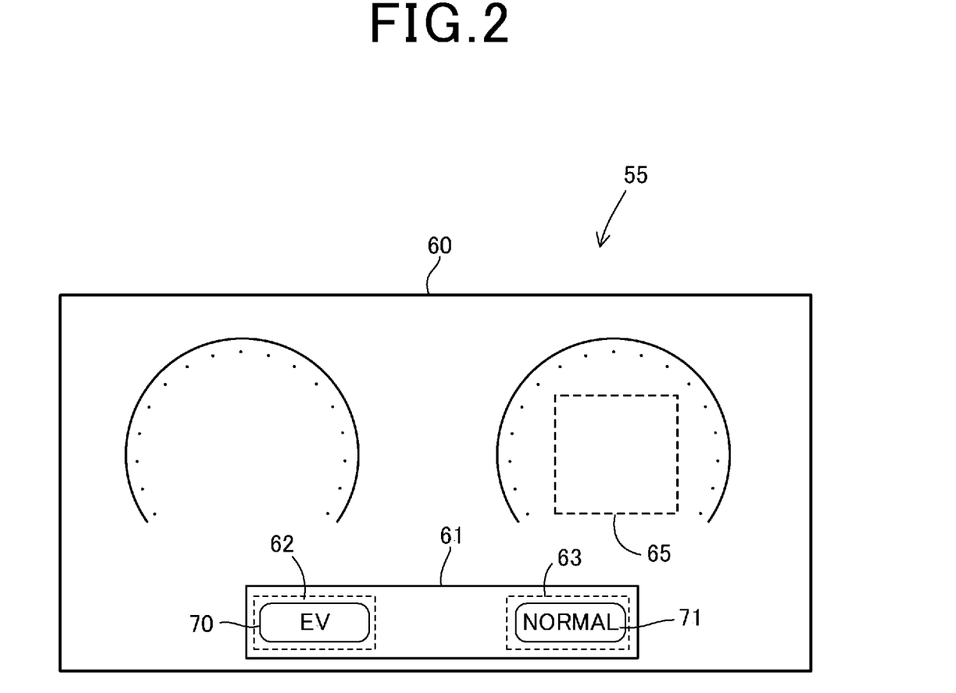
FIG. 2 is a diagram illustrating a display unit provided in the vehicle.

The METER 55 includes a multi information display (MID) 60 having a mode display unit 61 and a notification display unit 65, as illustrated in FIG. 2. In the mode display unit 61, an energy management mode indicator 70 is indicated in a first display region 62, and a drive mode indicator 71 is indicated in a second display region 63. The energy management mode indicator 70 is used for indicating a set energy management mode. The drive mode indicator 71 is used for indicating a set drive mode. Various notifications to be provided to a user may be indicated on the notification display unit 65. The energy management mode indicator 70 corresponds to an energy management mode display of the present disclosure, and the drive mode indicator 71 corresponds to a drive mode display of the present disclosure.

The drive unit 80 includes a drive motor 81, a power generation motor 82, an engine 83, and a battery 84. The drive motor 81 and the engine 83 are driving force sources of the vehicle 1, and the drive motor 81 is operated by electric power supplied from the battery 84. The battery 84 is charged by electric power output from the power generation motor 82 by a driving force of the engine 83 or regenerative breaking. Furthermore, the drive unit 80 includes various sensors that detect an operation state of the drive unit 80, a charging state of the battery 84, and the like. The drive unit 80 operates according to a control signal output from the vehicle control system 10, and a detection signal of the sensor provided in the drive unit 80 is input to the vehicle control system 10.

The transmission unit 90 includes a transmission such as a continuously variable transmission (CVT), and changes transmission gear ratio of a driving force by the drive unit 80 according to a control signal input from the vehicle control system 10. The transmission unit 90 includes a sensor configured to detect an operation state of the transmission, and outputs a detection signal indicating the operation state of the transmission to the vehicle control system 10.

The brake unit 91 includes a braking mechanism (not illustrated) and an adjusting mechanism (not illustrated) for setting a braking force by the braking mechanism, and changes the braking force by the braking mechanism according to a control signal input from the vehicle control system 10. The brake unit 91 includes a sensor configured to detect an operation state of the brake mechanism, and outputs a detection signal indicating the operation state of the braking mechanism to the vehicle control system 10.

The suspension unit 92 includes suspension (not illustrated) and a characteristic change mechanism (not illustrated) of the suspension, and changes characteristics (such as damping characteristics) of the suspension according to a control signal input from the vehicle control system 10. The suspension unit 92 includes a sensor configured to detect an operation state of the suspension, and outputs a detection signal indicating the operation state of the suspension to the vehicle control system 10.

The vehicle control system 10 is a control unit including a processor 20, a memory 30, an interface circuit (not illustrated), and the like. The processor 20 functions as an energy management mode change acceptance unit 21, a drive mode change acceptance unit 22, a mode setting control unit 23, a display control unit 24, a driving status recognition unit 25, and a vehicle control unit 26 by reading and executing a control program 31 stored in the memory 30. The energy management mode change acceptance unit 21 includes a function of the motor drive priority mode acceptance unit of the present disclosure. The processor 20 corresponds to a computer of the present disclosure.

Here, processing to be executed by the energy management change acceptance unit 21 includes a motor drive priority mode acceptance step in a vehicle control method of the present disclosure, and processing to be executed by the drive mode change acceptance unit 22 corresponds to a drive mode change acceptance step in the vehicle control method of the present disclosure. Processing to be executed by the mode setting control unit 23 corresponds to a mode setting control step in the vehicle control method of the present disclosure, and processing to be executed by the display control unit 24 corresponds to a display control step in the vehicle control method of the present disclosure. Processing to be executed by the driving status recognition unit 25 corresponds to a driving status recognition step in the vehicle control method in the present disclosure.

Figure 3:
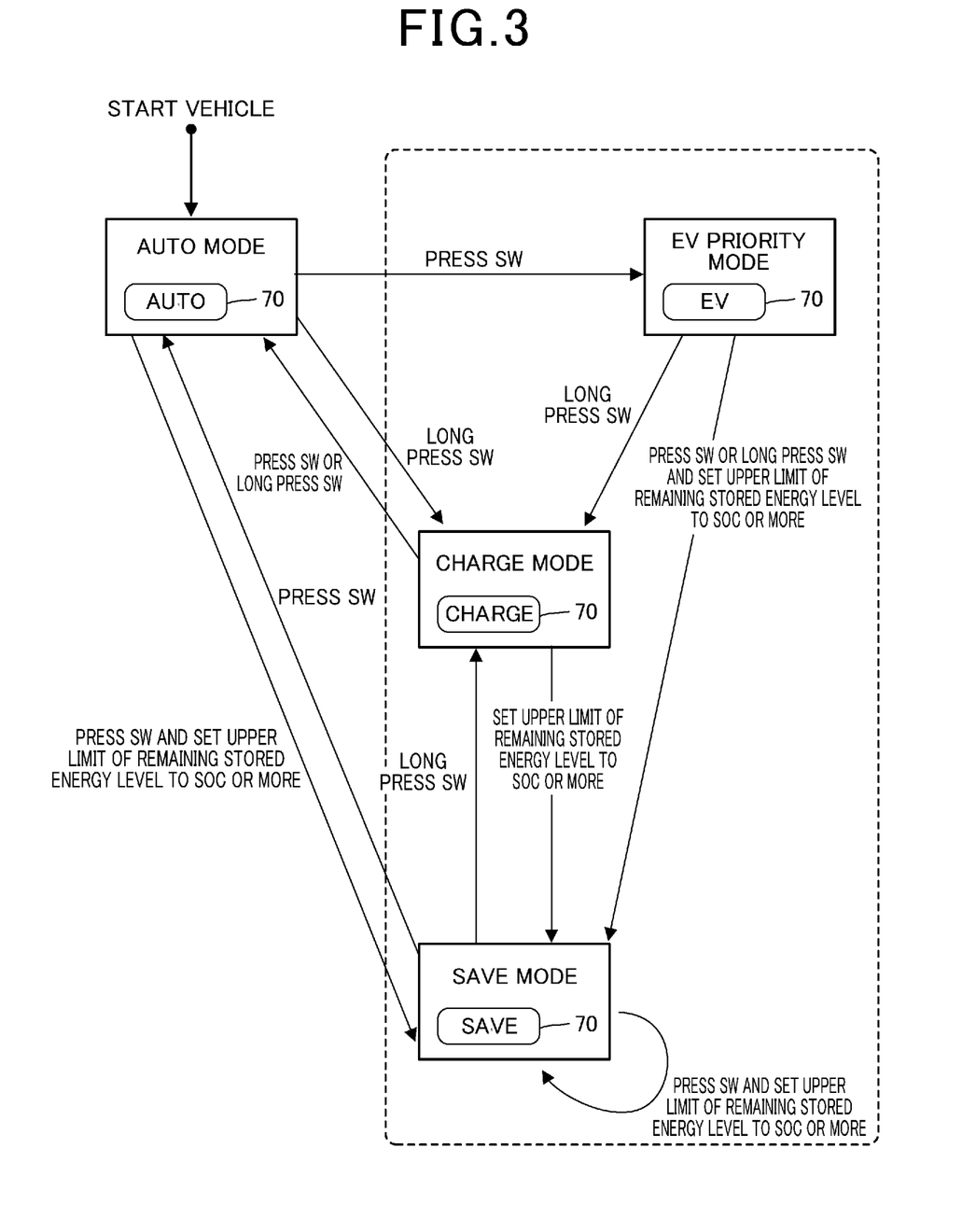
FIG. 3 is a diagram illustrating a transition of an energy management mode in response to an operation of an energy management mode switch.

The energy management mode change acceptance unit 21 accepts a change in the energy management mode according to a pressing operation of the energy management mode switch 52, according to a transition diagram illustrated in FIG. 3. SW in FIG. 3 represents the energy management mode switch 52. In each energy management mode, the following control is performed by the vehicle control unit 26.

EV priority mode . . . This mode is a mode in which the engine 83 is stopped and the driving only by the drive motor 81 is prioritized until a remaining stored energy level of the battery 84 falls below a lower limit level. The EV priority mode corresponds to the motor drive priority mode of the present disclosure.

CHARGE mode . . . The charging of the battery 84 is prioritized to operate the engine 83.

SAVE mode . . . The discharging of the battery 84 is limited to suppress reduction in the remaining stored energy level of the battery 84 while driving.

AUTO mode . . . The energy efficiency is prioritized to limit operation of the drive motor 81, the power generation motor 82, and the engine 83.

Figure 4:
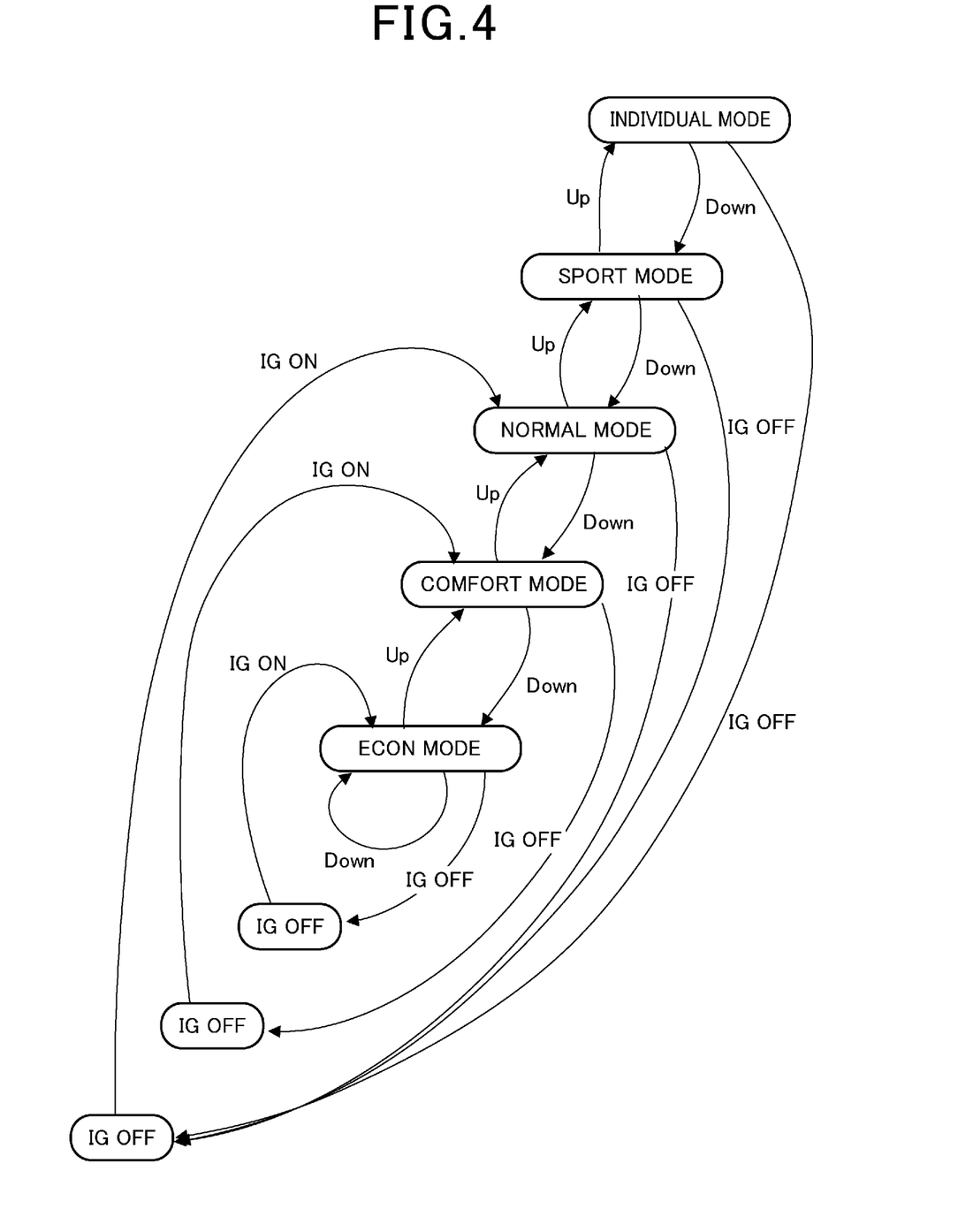
FIG. 4 is a diagram illustrating a transition of a drive mode in response to an operation of a drive mode switch.

The drive mode change acceptance unit 22 accepts a change in the drive mode according to the Up or Down operation to the drive mode switch 51, according to a transition diagram illustrated in FIG. 4. In FIG. 4, Up represents an Up operation to the drive mode switch 51, and Down represents a Down operation to the drive mode switch 51. IG ON represents an ON operation to an ignition (IG) switch (not illustrated), and IG OFF represents an OFF operation to the IG switch. In each drive mode, the following control is performed by the vehicle control unit 26.

NORMAL mode . . . Standard settings are used to control operation of the drive unit 80, the transmission unit 90, the brake unit 91, and the suspension unit 92. The NORMAL mode corresponds to a first drive mode of the present disclosure.

SPORT mode . . . The operation of the drive unit 80, the transmission unit 90, the brake unit 91, and the suspension unit 92 is controlled so that driving performance is further improved than that in the NORMAL mode. For example, the vehicle control unit 26 sets an upper limit of a rotation speed of the engine 83 more highly than that in the NORMAL mode, and sets a lower limit threshold of the remaining stored energy level of the battery 84 more highly than that in the NORMAL mode, to increase an output of the drive motor 81. Furthermore, the vehicle control unit 26 sets the setting of the suspension unit 92 more to the hard side than that in the NORMAL mode. The SPORT mode corresponds to a second drive mode of the present disclosure.

INDIVIDUAL mode . . . Operation of the drive unit 80, the transmission unit 90, the brake unit 91, and the suspension unit 92 is controlled according to conditions customized by the user. The INDIVIDUAL mode corresponds to a third drive mode of the present disclosure.

COMFORT mode . . . The operation of the drive unit 80, the transmission unit 90, the brake unit 91, and the suspension unit 92 is controlled so that behavior of the vehicle 1 is quieter than that in the NORMAL mode. For example, the suspension by the suspension unit 92 is set more to the soft side than that of the NORMAL mode.

ECON mode . . . Operation of the drive unit 80, the transmission unit 90, the brake unit 91, and the suspension unit 92 is controlled by setting with an emphasis on the fuel consumption as compared to the setting in the NORMAL mode.

The mode setting control unit 23 sets the energy management mode and the drive mode in response to acceptance of a change of the energy management mode by the energy management mode change acceptance unit 21 and acceptance of a change of the drive mode by the drive mode change acceptance unit 22. The display control unit 24 controls the display of the energy management mode indicator 70, the drive mode indicator 71, and the notification display unit 65, which are described above, with reference to FIG. 2.

The driving status recognition unit 25 recognizes the driving status of the vehicle 1 such as a driving speed based on detection signals of the speed sensor 40 and the yaw rate sensor 41. The vehicle control unit 26 controls operation of the drive unit 80, the transmission unit 90, the brake unit 91, and the suspension unit 92 based on the energy management mode and drive mode that are set by the mode setting control unit 23, and the driving status of the vehicle 1 that is recognized by the driving status recognition unit 25.

2. Processing of Changing Drive Mode

Figure 5:
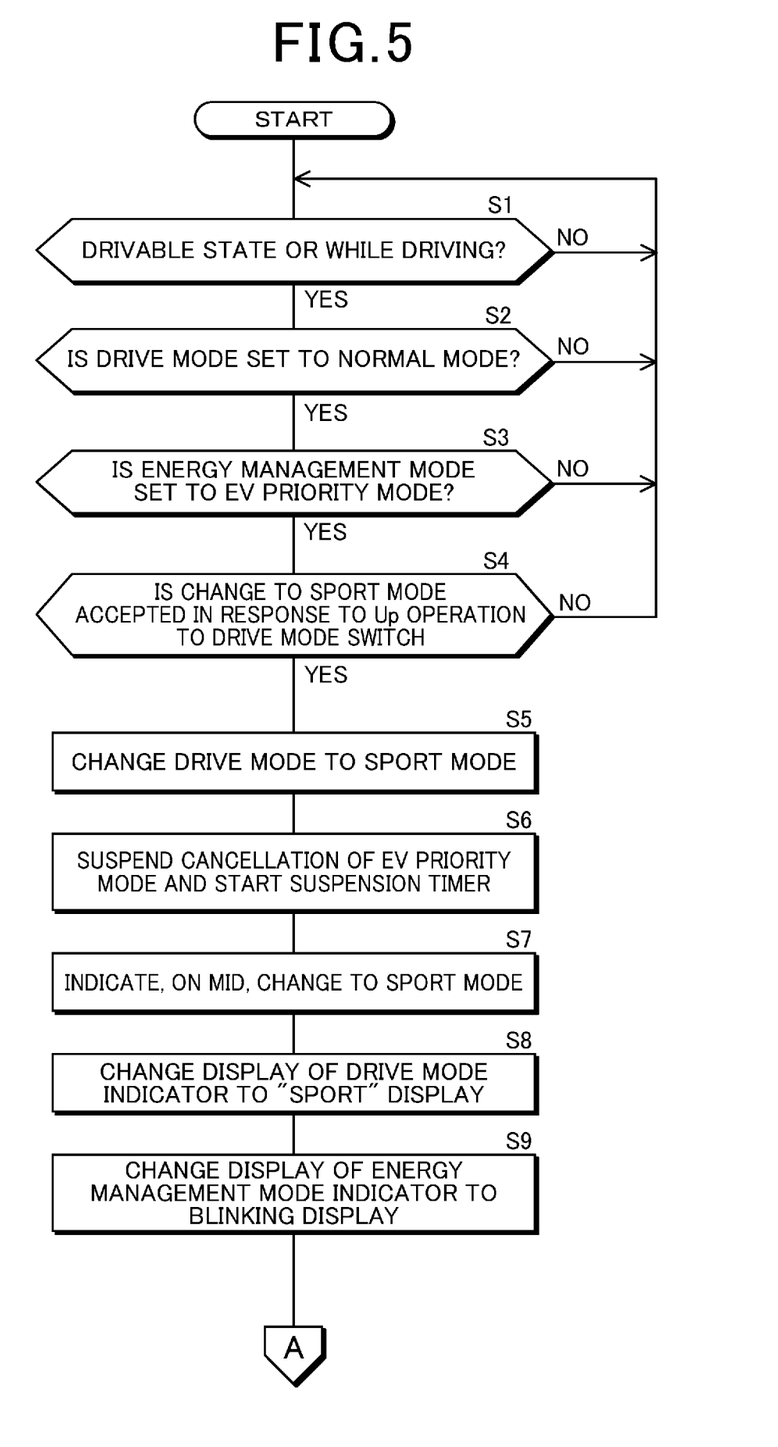
FIG. 5 is a first flowchart of processing of changing the drive mode.

Processing of changing the drive mode to be executed by the vehicle control system 10 will be described according to a flowchart illustrated in FIGS. 5 to 6. In steps S1 to S4 in FIG. 5, the mode setting control unit 23 determines whether the following conditions 1 to 4 are established.

Condition 1 (step S1) . . . The driving status recognition unit 25 recognizes a state in which the vehicle 1 is able to drive or is driving at a predetermined speed or more.

Condition 2 (step S2) . . . The mode setting control unit 23 sets a drive mode to the NORMAL mode.

Condition 3 (step S3) . . . The mode setting control unit 23 sets the energy management mode to the EV priority mode.

Condition 4 (step S4) . . . The drive mode change acceptance unit 22 accepts a change to the SPORT mode in response to the Up operation to the drive mode switch 51.

Then, the mode setting control unit 23 proceeds the processing to step S5 when all of the above-described conditions 1 to 4 are established. The mode setting control unit 23 changes the drive mode to the SPORT mode in step S5, but suspends the cancellation of the EV priority mode (change to the AUTO mode) to start a suspension timer in subsequent step S6. A set time of the suspension timer corresponds to a first predetermined period of time of the present disclosure, and a period of time until the suspension timer indicates that the time has expired corresponds to a first suspension period of time of the present disclosure.

In next step S7, the display control unit 24 indicates, on the notification display unit 65 (see FIG. 2) of the MID 60, that the drive mode has been changed to the SPORT mode. In subsequent step S8, the display control unit 24 changes the display of the drive mode indicator 71 in the MID 60 to the SPORT display. In step S9, the display control unit 24 changes the display of the energy management mode indicator 70 to the blinking display, and notifies that the cancellation of the EV priority mode is suspended. The blinking display corresponds to a second display aspect of the present disclosure, and an aspect in which the energy management mode indicator 70 is constantly indicated before the change to the blinking display corresponds to a first display aspect of the present disclosure.

Subsequently, in loop processing of steps S10 and S11 in FIG. 6, the mode setting control unit 23 determines, in step S10, whether the drive mode change acceptance unit 22 has accepted the change to the INDIVIDUAL mode in response to the Up operation to the drive mode switch 51 until, in step S11, the suspension timer indicates that the time has expired. Then, when determining that the change to the INDIVIDUAL mode has been accepted, the mode setting control unit 23 proceeds the processing from step S10 to step S20. Then, when the suspension timer indicates that the time has expired, the mode setting control unit 23 proceeds the processing from step S11 to step S12.

Steps S12 to S16 are processing for canceling the EV priority mode to determine the change of the drive mode to the SPORT mode. In step S12, the mode setting control unit 23 changes the energy management mode to the AUTO mode to cancel the EV priority mode. In next step S13, the display control unit 24 indicates on the notification display unit 65 of the MID 60, that the drive mode has been changed to the SPORT mode.

In subsequent step S14, the display control unit 24 indicates, on the notification display unit 65 of the MID 60, that the EV priority mode has been canceled to prioritize the drive mode (here, the SPORT mode). In next step S16, the display control unit 24 ends the blinking display of the energy management mode indicator 70 and changes the display of the energy management mode indicator 70 to the AUTO display.

Here, the settings of the drive mode and energy management mode and the display aspect of the MID 60 in the above-described processing of steps S10 to S16 in FIGS. 5 and 6 will be described with reference to a timing chart illustrated in FIG. 7. FIG. 7 illustrates a state in which the drive mode is set to the NORMAL mode, the energy management mode is set to the EV priority mode, and the drive mode switch 51 is set to Up at t1 while the vehicle 1 is driving.

At t1, the mode setting control unit 23 changes the drive mode from the NORMAL mode to the SPORT mode, but suspends the cancellation of the EV priority mode (change to the AUTO mode) to start the suspension timer. In FIG. 7, the set time of the suspension timer is represented by Tw. The display control unit 24 indicates, on the notification display unit 65 of the MID 60, a notification 100 that the drive mode has been changed to the SPORT mode. Furthermore, at step S15, the display control unit 24 changes the display of the drive mode indicator 71 in the MID 60 from the NORMAL display to the SPORT mode, and changes the display of the energy management mode indicator 70 to the blinking display.

At t2 at which Tw has elapsed without operating the drive mode switch 51 and the suspension timer indicates that the time has expired, the mode setting control unit 23 changes the energy management mode from the EV priority mode to the AUTO mode (cancellation of the EV priority mode). The display control unit 24 indicates, on the notification display unit 65 in the MID 60, a notification 101 that the EV priority mode has been canceled to prioritize the drive mode. Furthermore, the display control unit 24 ends the blinking display of the energy management mode indicator 70 and changes the display of the energy management mode indicator 70 from "EV" to "AUTO."

Figure 6:
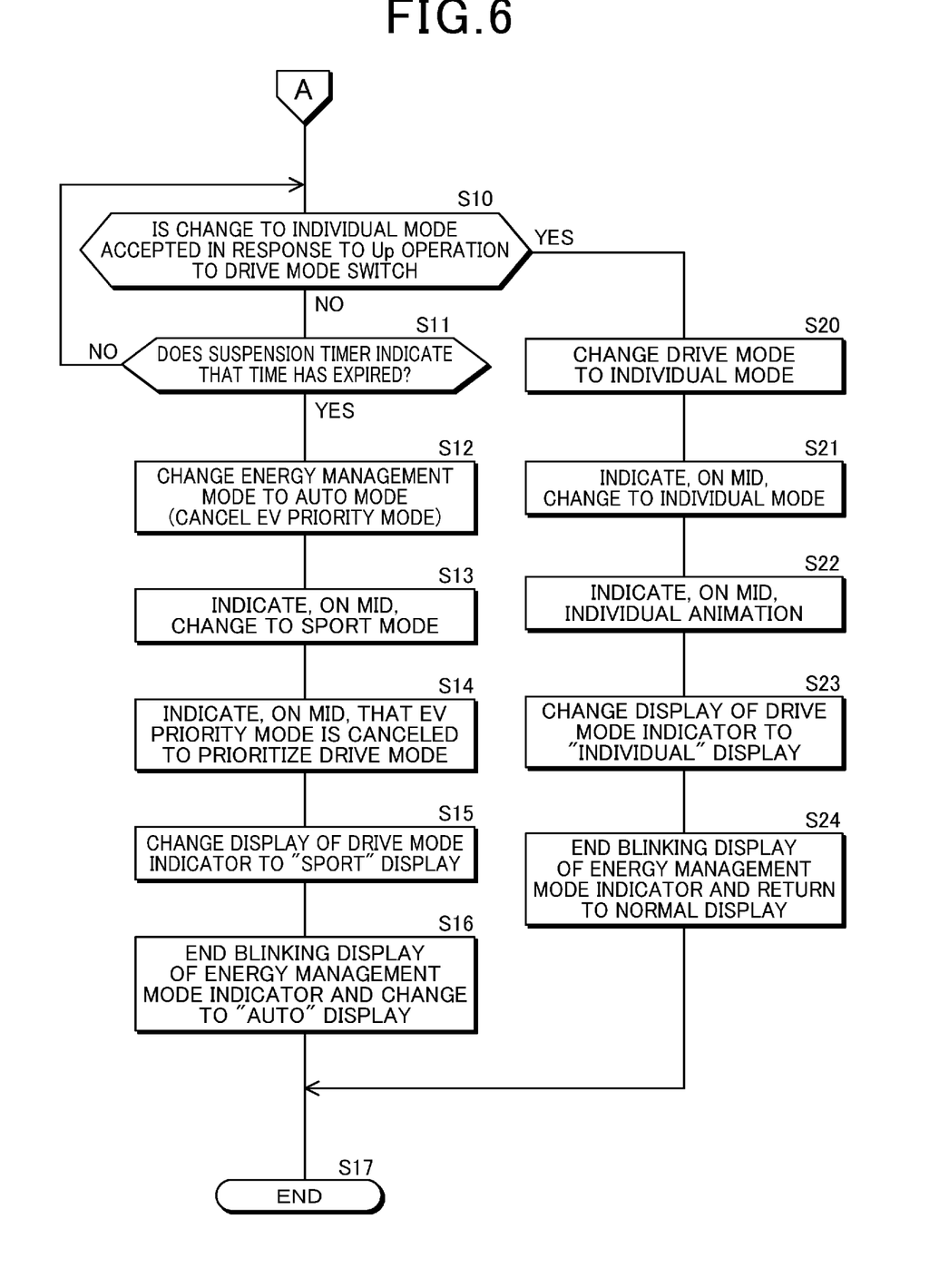
FIG. 6 is a second flowchart of processing of changing the drive mode.
Figure 7:
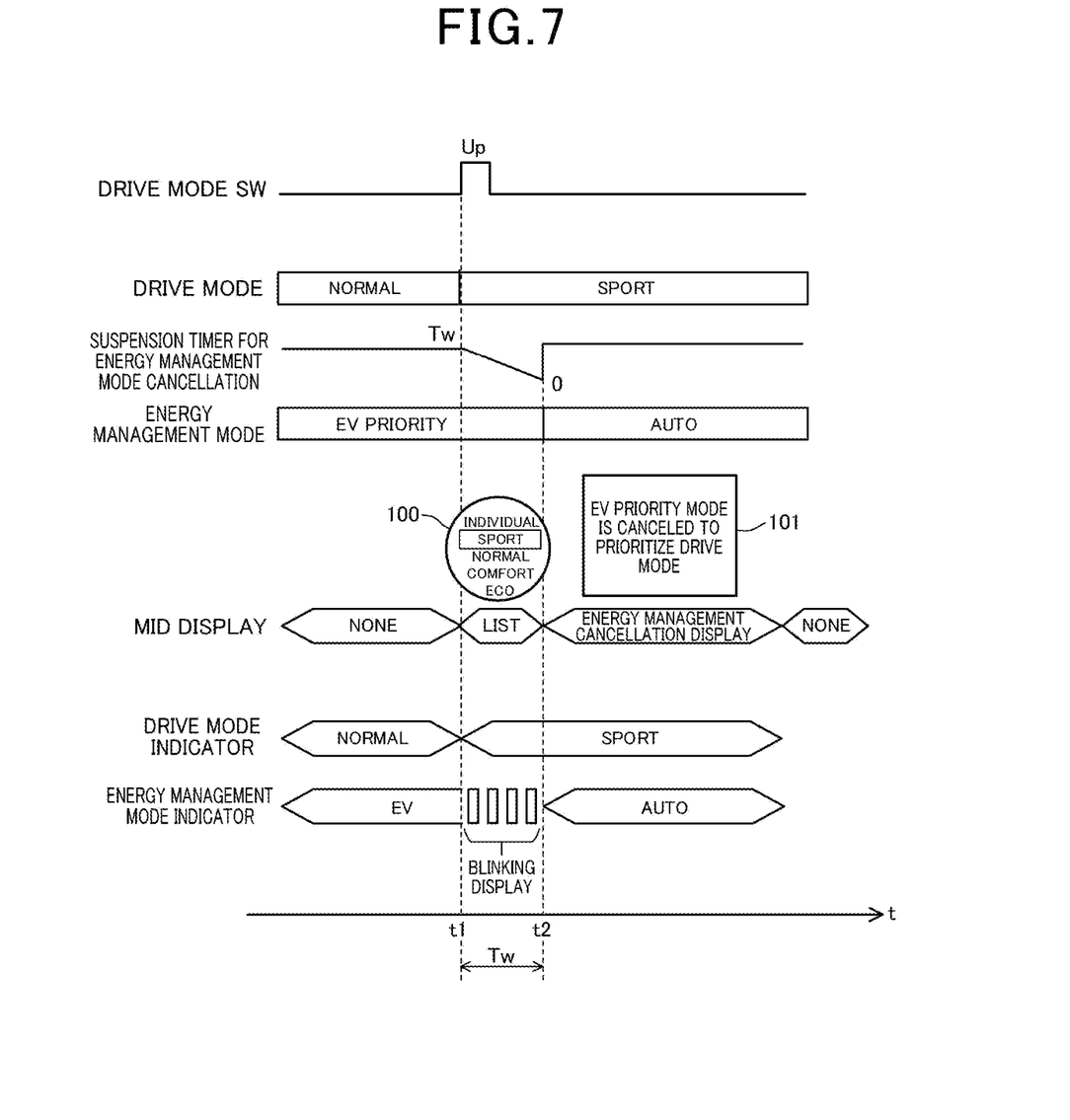
FIG. 7 is a timing chart when the drive mode has been switched from a NORMAL mode to a SPORT mode.

Next, steps S20 to S24 in FIG. 6 are processing for maintaining a state in which the energy management mode is set to the EV priority mode and further changing the drive mode from the SPORT mode to the INDIVIDUAL mode. In step S20, the mode setting control unit 23 changes the drive mode from the SPORT mode to the INDIVIDUAL mode. In the next steps S21 and S22, the display control unit 24 indicates, on the notification display unit 65 in the MID 60, the change to the INDIVIDUAL mode (S21), and an animation (S22) indicating that the drive mode has been changed to the INDIVIDUAL mode.

In subsequent step S23, the display control unit 24 changes the display of the drive mode indicator 71 in the MID 60 from the SPORT display to the INDIVIDUAL display. In next step S24, the display control unit 24 ends the blinking display of the energy management mode indicator 70 to return to the normal display, and proceeds the processing to step S17.

Figure 8:
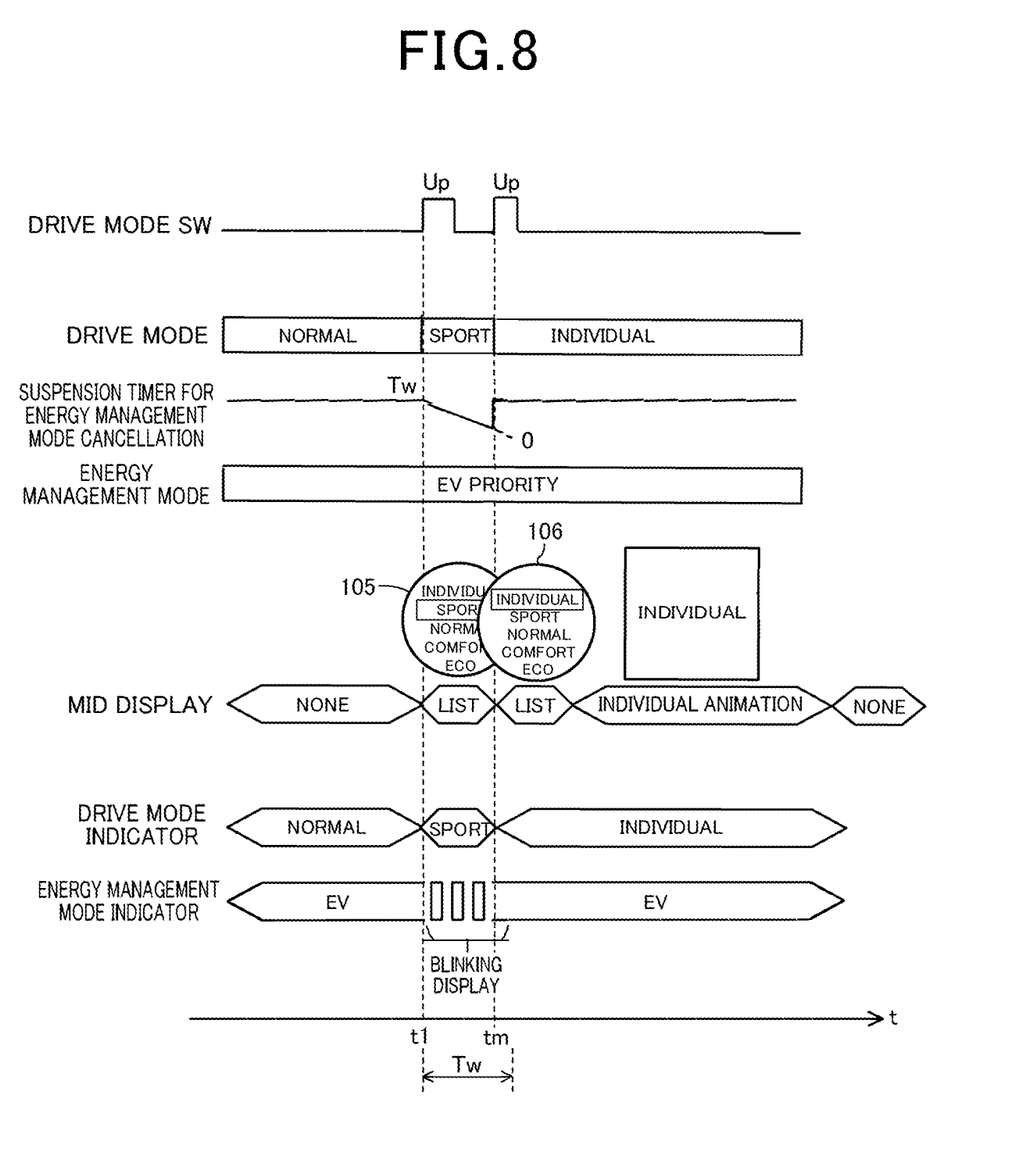
FIG. 8 is a timing chart when the drive mode has been switched from the NORMAL mode to an INDIVIDUAL mode via the SPORT mode.

Here, the settings of the drive mode and energy management mode and the display aspect of the MID 60 in the above-described processing of steps S10 to S24 in FIGS. 5 and 6 will be described with reference to a timing chart illustrated in FIG. 8. FIG. 8 illustrates a state in which the drive mode is set to the NORMAL mode, the energy management mode is set to the EV priority mode, and the Up operation is made to the drive mode switch 51 at t1 and tm while the vehicle 1 is driving.

At t1, the mode setting control unit 23 changes the drive mode from the NORMAL mode to the SPORT mode, but suspends the cancellation of the EV priority mode (change to the AUTO mode) to start the suspension timer. The display control unit 24 indicates, on the notification display unit 65 in the MID 60, a notification 105 that the drive mode has been changed to the SPORT mode. Furthermore, the display control unit 24 changes the display of the drive mode indicator 71 in the MID 60 from the NORMAL display to the SPORT mode, and changes the display of the energy management mode indicator 70 to the blinking display.

Subsequently, at tm, the, mode setting control unit 23 changes the drive mode from the SPORT mode to the INDIVIDUAL mode, and the energy management mode is maintained to the EV priority mode. The display control unit 24 indicates, on the notification display unit 65 in the MID 60, a list 106 indicating that the drive mode has been changed to the INDIVIDUAL mode, and then indicates the animation of the INDIVIDUAL mode on the notification display unit 65 in the MID 60.

Furthermore, the display control unit 24 changes the display of the drive mode indicator 71 in the MID 60 from the SPORT display to the INDIVIDUAL display, and ends the blinking display of the energy management mode indicator 70 to return to the normal display.

3. Other Embodiments

In the above-described embodiment, when it is detected an operation of the accelerator pedal (corresponding to an accelerator operation unit of the present disclosure) by the accelerator pedal sensor 43 before, at step S11 in FIG. 6, the suspension timer indicates that the time has expired, the processing may proceed to step S12 without waiting for the time expiration of the suspension timer so that the mode setting control unit 23 can rapidly cancel the EV priority mode.

Figure 9:
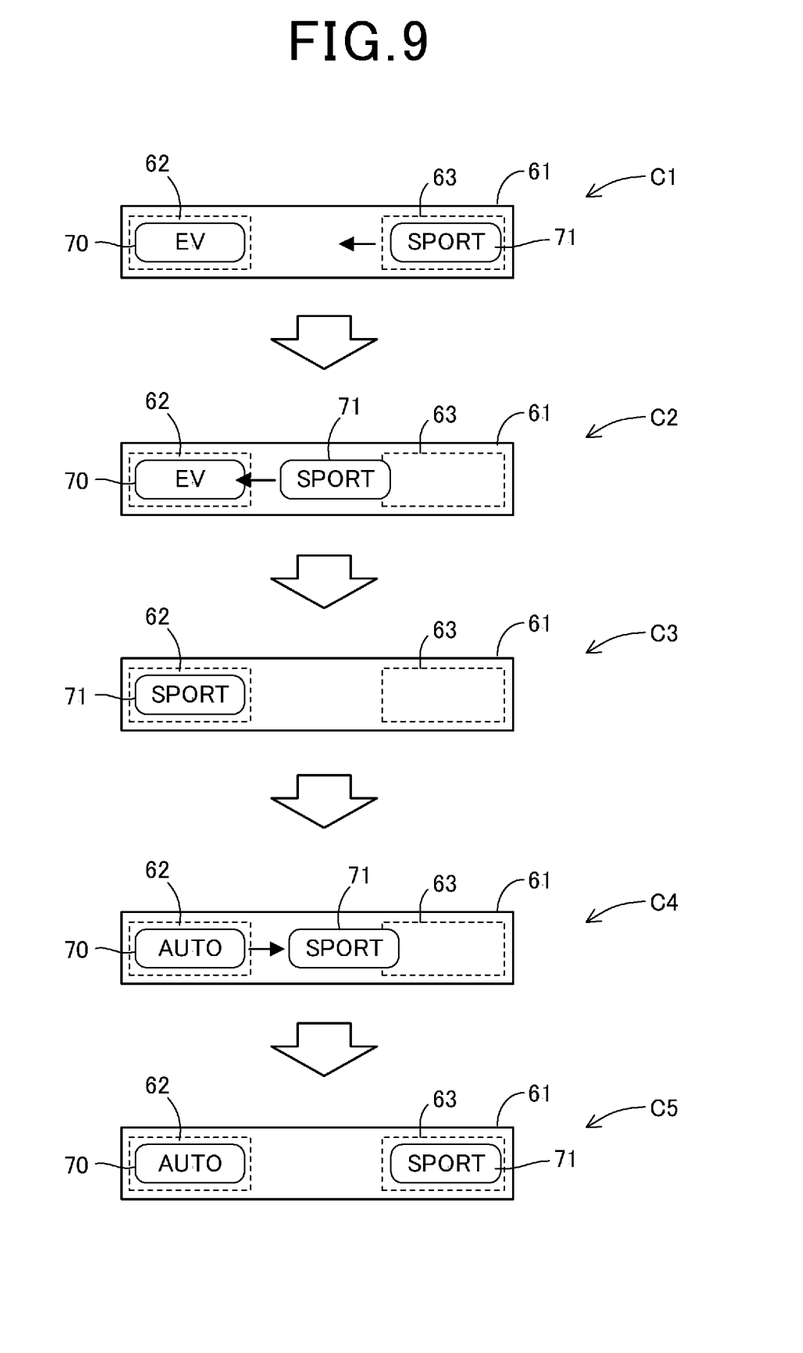
FIG. 9 is a diagram illustrating an animation for notifying that the EV priority mode has been canceled by switching to a SPORT mode.

In the above-described embodiment, when the mode setting control unit 23 changes the drive mode from the NORMAL mode to the SPORT mode and changes the energy management mode from the EV priority mode to the AUTO mode, the mode setting control unit 23 may indicate the animation illustrated in FIG. 9 on the MID 60. The display control unit 24 indicates the animation while switching the display on the mode display unit 61 in the MID 60 in order of C1, C2, C3, C4, and C5 in FIG. 9, thereby notifying that the EV priority mode has been canceled by switching the drive mode to the SPORT mode.

In C1 in FIG. 9, the display control unit 24 indicates the energy management mode indicator 70 in the first display region 62 of the mode display unit 61 and indicates the drive mode indicator 71 in the second display region 63. Next, the display control unit 24 moves the drive mode indicator 71 to the first display region 62 as illustrated in C2, and hides the energy management mode indicator 70 behind the drive mode indicator 71 as illustrated in C3. Next, the display control unit 24 moves the drive mode indicator 71 to the second display region 63, and indicates the energy management mode indicator 70 having the AUTO display in the first display region, as illustrated in C4 and C5.

In the above-described embodiment, when the change to the INDIVIDUAL mode is accepted in step S10 in FIG. 6 and the processing proceeds to step S20, the suspension timer may be restarted, suspend the cancellation of the EV prior model and perform processing similar as steps S10 to S16 and steps S20 to S24. This processing enables the drive mode to change from the NORMAL mode (corresponding to the first drive mode of the present disclosure) to a fourth drive mode via the SPORT mode (corresponding to the second drive mode of the present disclosure) and the INDIVIDUAL mode (corresponding to the third drive mode of the present disclosure) while maintaining the setting of the EV priority mode, when the specification is defined such that the fourth drive mode which does not require the cancellation of the EV priority mode is selected subsequent to the INDIVIDUAL mode. When the suspension timer is restarted, a set time of the suspension timer corresponds to a second predetermined period of time of the present disclosure, and a period of time until the restarted suspension timer indicates that the time has expired corresponds to a second suspension period of time of the present disclosure.

Figure 1:
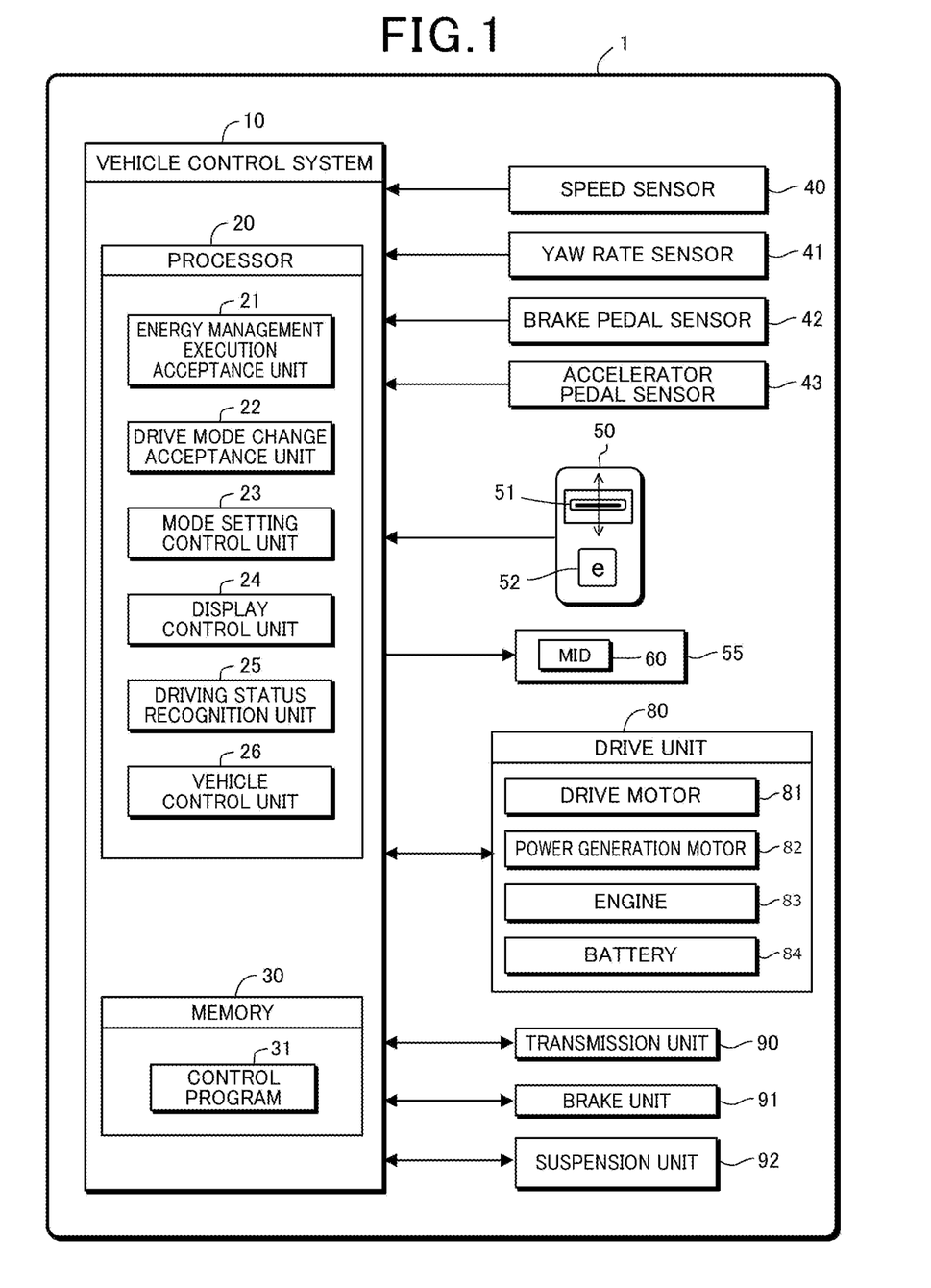
FIG. 1 is a configuration diagram of a vehicle control system and a vehicle mounted with the vehicle control system.

Note that FIG. 1 is a schematic diagram illustrating configurations of the vehicle 1 and the vehicle control system 10 by dividing the configurations according to the main processing contents in facilitate understanding of the invention of the present application, and the configurations of the vehicle control system 10 may be configured according to other divisions. Furthermore, the processing of each component may be executed by one hardware unit, or may be executed by a plurality of hardware units. Furthermore, the processing of each component may be executed by one program, or may be executed by a plurality of programs.

4. Configurations Supported by the Above-Described Embodiments

The above-described embodiments are specific examples of the following configurations.

(Configuration 1) A control system of a vehicle capable of switching a plurality of drive modes using an engine and a motor as driving force sources, and setting and canceling a motor drive priority mode in which driving only by the motor is prioritized, the drive modes including a first drive mode, a second drive mode, and a third drive mode, the control system, including a motor drive priority mode acceptance unit configured to accept setting and cancellation of the motor drive priority mode in response to an operation by a user of the vehicle, a drive mode change acceptance unit configured to accept a change in the drive mode in order of the first drive mode, the second drive mode, and the third drive mode every time a selection operation is performed by the user, a mode setting control unit configured to perform setting and cancellation of the motor drive priority mode and setting the drive mode according to an acceptance status by the motor drive priority mode acceptance unit and the drive mode change acceptance unit, and cancel the motor drive priority mode to set to the second drive mode, a display control unit configured to indicate, on a display unit provided in the vehicle, an energy management mode display indicating a setting status of the motor drive priority mode and a drive mode display indicating a setting status of the drive mode, and a driving status recognition unit configured to recognize a driving status of the vehicle, wherein the mode setting control unit suspends cancellation of the motor drive priority mode when the drive mode is changed from the first drive mode to the second drive mode in response to acceptance of a change to the second drive mode by the drive mode change acceptance unit when the driving status recognition unit recognizes that the vehicle is drivable or is driving in a state in which the motor drive priority mode is set and the drive mode is set to the first drive mode, and cancels the suspension to cancel the motor drive priority mode when the drive mode change acceptance unit does not accept a change to the third drive mode during a first suspension period of time from a time point at which the drive mode is changed from the first drive mode to the second drive mode until a first predetermined period of time elapses, and the display control unit sets the energy management mode display to a second display aspect different from a first display aspect when the suspension is not made, while the cancellation of the motor drive priority mode is suspended by the mode setting control unit.

The vehicle control system of configuration 1 can reduce user's feeling of strangeness by canceling or suspending the motor drive priority mode in response to a change in a drive mode.

(Configuration 2) The vehicle control system according to configuration 1, wherein the mode setting control unit cancels the suspension when the drive mode change acceptance unit accepts a change from the second drive mode to the third drive mode before the first suspension period of time elapses, and sets or cancels the motor drive priority mode according to a specification of the third drive mode.

The vehicle control system of configuration 2 can change the drive mode from the first drive mode to the third drive mode via the second drive mode while maintaining the setting of the motor drive priority mode.

(Configuration 3) The vehicle control system according to configuration 1, wherein the drive mode includes a fourth drive mode, and the drive mode change acceptance unit accepts a change in the drive mode in order of the first drive mode, the second drive mode, the third drive mode and the fourth drive mode every time a selection operation is performed by the user, and the mode setting control unit changes the drive mode to the third drive mode when the drive mode change acceptance unit accepts a change to the third drive mode before the first suspension period of time elapses, cancels the suspension when the drive mode change acceptance unit does not accept a change to the fourth drive mode during a second suspension period of time from a time point at which a change to the third drive mode is accepted until a second predetermined period of time elapses, and sets or cancels the motor drive priority mode according to a specification of the third drive mode.

The vehicle control system of configuration 3 can change the drive mode from the first drive mode to the fourth drive mode via the second drive mode and the third drive mode while maintaining the setting of the motor drive priority mode.

(Configuration 4) The vehicle control system according to any one of configurations 1 to 3, wherein the mode setting control unit cancels the suspension when an operation of an acceleration operation unit provided in the vehicle is performed during the first suspension period of time, to cancel the motor drive priority mode.

The vehicle control system of configuration 4 can rapidly cancel the motor drive priority mode when intention of a user to increase a driving force is inferred, whereby the driving force can be increased.

(Configuration 5) The vehicle control system according to any one of configurations 1 to 4, wherein the display control unit indicates, on the display unit, a reason why the motor drive priority mode is canceled when the motor drive priority mode is canceled in response to the cancellation of the suspension by the mode setting control unit.

The vehicle control system of configuration 5 can reduce user's feeling of strangeness when the engine starts in response to the cancellation of the motor drive priority mode by indicating the reason why the motor drive priority mode is canceled.

(Configuration 6) The vehicle control system according to any one of configurations 1 to 4, wherein the display control unit indicates the energy management mode display on a first display region in the display unit and indicates the drive mode display on a second display region in the display unit, and when the suspension is canceled to cancel the motor drive priority mode by the mode setting control unit, the drive mode display indicated on the second display region is moved to the first display region to hide the energy management mode display, and then the drive mode display is moved to the second display region and the energy management mode display indicating that the motor drive priority mode is canceled is indicated in the first display region.

The vehicle control system of configuration 6 can use the animation to notify the user that the motor drive priority mode is canceled according to a specification of the drive mode.

(Configuration 7) The vehicle control system according to any one of configurations 1 to 6, wherein the second display aspect is a display aspect in which an indication according to the first display aspect blinks or fades out.

The vehicle control system of configuration 7 can notify the user that invalidating the energy management function is suspended by causing the indication according to the first display aspect to blink or fade out.

(Configuration 8) A vehicle control method to be executed by a computer to control a vehicle capable of switching a plurality of drive modes using an engine and a motor as driving force sources, and setting and canceling a motor drive priority mode in which driving only by the motor is prioritized, the drive modes including a first drive mode, a second drive mode, and a third drive mode, the method including a motor drive priority mode acceptance step of accepting setting and cancellation of the motor drive priority mode in response to an operation by a user of the vehicle, a drive mode change acceptance step of accepting a change in the drive mode in order of the first drive mode, the second drive mode, and the third drive mode every time a selection operation is performed by the user, a mode setting control step of performing setting and cancellation of the motor drive priority mode and setting the drive mode according to an acceptance status by the motor drive priority mode acceptance step and the drive mode change acceptance step, and canceling the motor drive priority mode to set to the second drive mode, a display control step of indicating, on a display unit provided in the vehicle, an energy management mode display indicating a setting status of the motor drive priority mode and a drive mode display indicating a setting status of the drive mode, and a driving status recognition step of recognizing a driving status of the vehicle, wherein the mode setting control step suspends cancellation of the motor drive priority mode when the drive mode is changed from the first drive mode to the second drive mode in response to acceptance of a change to the second drive mode by the drive mode change acceptance step when the driving status recognition step recognizes that the vehicle is drivable or is driving in a state in which the motor drive priority mode is set and the drive mode is set to the first drive mode, and cancels the suspension to cancel the motor drive priority mode when the drive mode change acceptance step does not accept a change to the third drive mode during a first suspension period of time from a time point at which the drive mode is changed from the first drive mode to the second drive mode until a first predetermined period of time elapses, and the display control step sets the energy management mode display to a second display aspect different from a first display aspect when the suspension is not made, while the cancellation of the motor drive priority mode is suspended by the mode setting control step.

Effects and advantages similar to those in the vehicle control system of configuration 1 can be obtained by causing the computer to execute the vehicle control method of configuration 8.

REFERENCE SIGNS LIST

1 ... Vehicle (own vehicle), 10 ... Vehicle control system, 20 ... Processor, 21 ... Energy management change acceptance unit, 22 ... Drive mode change acceptance unit, 23 ... Mode setting control unit, 24 ... Display control unit, 25 ... Driving status recognition unit, 26 ... Vehicle control unit, 30 ... Memory, 31 ... Control program, 40 ... Speed sensor, 41 ... Yaw rate sensor, 42 ... Brake pedal sensor, 43 ... Accelerator pedal sensor, 50 ... Switch unit, 51 ... Drive mode switch, 52 ... Energy management mode switch, 55 ... METER (display unit), 60 ... MID, 62 ... First display region, 63 ... Second display region, 70 ... Energy management mode indicator (energy management mode display), 71 ... Drive mode indicator (Drive mode display), 80 ... Drive unit, 81 ... Drive motor, 82 ... Power generation motor, 83 ... Engine, 84 ... Battery, 90 ... Transmission unit, 91 ... Brake unit, 92 ... Suspension unit

What is claimed is:

1. A control system for switching a plurality of drive modes and changing an energy management mode of a vehicle comprising:
    a drive unit including a drive motor, a power generation motor, an engine, and a battery;
    a transmission unit that includes a transmission which changes a gear ratio of a driving force by the drive unit;
    a brake that changes a braking force; and
    a suspension,
    wherein
    the drive modes include:
        a first drive mode for controlling an operation of the drive unit, the transmission unit, the brake, and the suspension using predetermined settings that are set in advance;
        a second drive mode in which the operation of the drive unit, the transmission unit, the brake, and the suspension is controlled so that driving performance is improved than that in the first drive mode; and
        a third drive mode for controlling the operation of the drive unit, the transmission unit, the brake, and the suspension according to customized settings customized by a user of the vehicle, the customized settings being different from the predetermined settings,
    the energy management mode includes a motor drive priority mode in which the engine is stopped and the vehicle is driven only by the drive motor until a remaining stored energy level of the battery falls below a lower limit level,
    the control system comprising a processor which includes:
        a motor drive priority mode acceptance unit configured to accept, in response to an operation by the user, whether to set the energy management mode to the motor drive priority mode or to another mode different from the motor drive priority mode;
        a drive mode change acceptance unit configured to accept a change in drive mode in order of the first drive mode, the second drive mode, and the third drive mode every time a selection operation of the drive mode is performed by the user;
        a mode setting control unit configured to set the energy management mode to the motor drive priority mode, to change the energy management mode to the another mode different from the motor drive priority mode, and to change the drive mode, wherein when setting the drive mode to the second drive mode, the mode setting control unit changes the energy management mode to the another mode different from the motor drive priority mode;
        a display control unit configured to indicate, on a display provided in the vehicle, an energy management mode display indicating a setting status of the energy management mode and a drive mode display indicating a setting status of the drive mode; and
        a driving status recognition unit configured to recognize a driving status of the vehicle,
    wherein the mode setting control unit suspends a setting of the energy management mode to the motor drive priority mode when the drive mode is changed from the first drive mode to the second drive mode in response to an acceptance of a change to the second drive mode by the drive mode change acceptance unit when the driving status recognition unit recognizes that the vehicle is drivable or is driving in a state in which the energy management mode is set to the motor drive priority mode and the drive mode is set to the first drive mode, and changes the setting of the energy management mode to the another mode different from the motor drive priority mode when the drive mode change acceptance unit does not accept a change to the third drive mode during a first suspension period of time from a time point at which the drive mode is changed from the first drive mode to the second drive mode until a first predetermined period of time elapses,
    the display control unit changes a display on the display between a first display aspect and a second display aspect different from the first display aspect based on whether the motor drive priority mode is suspended, and
    the display control unit indicates the energy management mode display on a first display region in the display and indicates the drive mode display on a second display region in the display, and when the setting of the energy management mode is changed to the another mode different from the motor drive priority mode by the mode setting control unit, the drive mode display indicated on the second display region is moved to the first display region to hide the energy management mode display, and then the drive mode display is moved to the second display region and the energy management mode display indicating that the setting of the energy management mode is set to the another mode different from the motor drive priority mode is indicated in the first display region.

2. The control system according to claim 1, wherein the mode setting control unit, when the drive mode change acceptance unit accepts a change from the second drive mode to the third drive mode before the first suspension period of time elapses, sets the setting of the energy management mode to the motor drive priority mode or changes the setting of the energy management mode to the another mode different from the motor drive priority mode according to a specification of the third drive mode.

3. The control system according to claim 1, wherein the drive modes include a fourth drive mode, and the drive mode change acceptance unit accepts a change in the drive mode in order of the first drive mode, the second drive mode, the third drive mode and the fourth drive mode every time a selection operation is performed by the user, and the mode setting control unit changes the drive mode to the third drive mode when the drive mode change acceptance unit accepts a change to the third drive mode before the first suspension period of time elapses, when the drive mode change acceptance unit does not accept a change to the fourth drive mode during a second suspension period of time from a time point at which a change to the third drive mode is accepted until a second predetermined period of time elapses, sets the setting of the energy management mode to the motor drive priority mode or changes the setting of the energy management mode to the another mode different from the motor drive priority mode.

4. The control system according to claim 1, wherein the mode setting control unit, when an operation of an acceleration operation unit provided in the vehicle is performed during the first suspension period of time, changes the setting of the energy management mode to the another mode different from the motor drive priority mode.

5. The control system according to claim 1, wherein the display control unit indicates, on the display, a reason why the setting of the energy management mode is changed to the another mode different from the motor drive priority mode when the setting of the energy management mode is changed to the another mode different from the motor drive priority mode by the mode setting control unit.

6. The control system according to claim 1, wherein the first display aspect is an aspect to constantly display the energy management mode display, the second display aspect is a display aspect in which an indication according to the first display aspect is changed to a blinking display or in which a display according to the first display aspect is faded out.

7. A vehicle control method, for switching a plurality of drive modes and changing an energy management mode, to be executed by a computer to control a vehicle comprising:

a drive unit including a drive motor, a power generation motor, an engine, and a battery;
a transmission unit that includes a transmission which changes a gear ratio of a driving force by the drive unit;
a brake that changes a braking force; and
a suspension,
the drive modes including:
  a first drive mode for controlling an operation of the drive unit, the transmission unit, the brake, and the suspension using predetermined settings that are set in advance;
  a second drive mode in which the operation of the drive unit, the transmission unit, the brake, and the suspension is controlled so that driving performance is improved than that in the first drive mode; and
  a third drive mode for controlling the operation of the drive unit, the transmission unit, the brake, and the suspension according to customized settings customized by a user of the vehicle, the customized settings being different from the predetermined settings,
the energy management mode includes a motor drive priority mode in which the engine is stopped and the vehicle is driven only by the drive motor until a remaining stored energy level of the battery falls below a lower limit level,
the method comprising:
a motor drive priority mode acceptance step of accepting, in response to an operation by the user, whether to set the energy management mode to the motor drive priority mode or to another mode different from the motor drive priority mode;
a drive mode change acceptance step of accepting a change in the drive mode in order of the first drive mode, the second drive mode, and the third drive mode every time a selection operation of the drive mode is performed by the user;
a mode setting control step of setting the energy management mode to the motor drive priority mode, changing the energy management mode to the another mode different from the motor drive priority mode, and changing the drive mode, wherein when setting the drive mode to the second drive mode, changing the energy management mode to the another mode different from the motor drive priority mode;
a display control step of indicating, on a display provided in the vehicle, an energy management mode display indicating a setting status of the energy management mode and a drive mode display indicating a setting status of the drive mode; and
a driving status recognition step of recognizing a driving status of the vehicle,
wherein the mode setting control step suspends a setting of the energy management mode to the motor drive priority mode when the drive mode is changed from the first drive mode to the second drive mode in response to an acceptance of a change to the second drive mode by the drive mode change acceptance step when the driving status recognition step recognizes that the vehicle is drivable or is driving in a state in which the energy management mode is set to the motor drive priority mode and the drive mode is set to the first drive mode, and changes the setting of the energy management mode to the another mode different from the motor drive priority mode when the drive mode change acceptance step does not accept a change to the third drive mode during a first suspension period of time from a time point at which the drive mode is changed from the first drive mode to the second drive mode until a first predetermined period of time elapses, the display control step includes changing a display on the display between a first display aspect and a second display aspect different from the first display aspect based on whether the motor drive priority mode is suspended, and the display control step includes indicating the energy management mode display on a first display region in the display and indicates the drive mode display on a second display region in the display, and when the setting of the energy management mode is changed to the another mode different from the motor drive priority mode in the mode setting control step, the drive mode display indicated on the second display region is moved to the first display region to hide the energy management mode display, and then the drive mode display is moved to the second display region and the energy management mode display indicating that the setting of the energy management mode is set to the another mode different from the motor drive priority mode is indicated in the first display region.

* * * * *